United States Patent
Peterson et al.

[15] 3,661,264
[45] May 9, 1972

[54] LOG BOOM SYSTEM FOR SWEEPING OIL SLICKS FROM A LARGE BODY OF WATER

[72] Inventors: David L. Peterson, 1121 Arrowhead Rd., Anchorage, Alaska 55803; Clifford M. Cole, Route 6, Box 6197, Bainbridge Island, Wash. 98110

[22] Filed: Dec. 1, 1969

[21] Appl. No.: 881,163

[52] U.S. Cl. .....................................210/242, 210/DIG. 21
[51] Int. Cl. .........................................................C02b 9/02
[58] Field of Search.............210/83, 242, 523, 532, DIG. 21; 61/28

[56] References Cited

UNITED STATES PATENTS

| | | |
|---|---|---|
| 61,880 | 2/1867 | Serrell ...................................210/242 |
| 1,591,024 | 7/1926 | Dodge...............................210/523 X |
| 3,348,690 | 10/1967 | Cornelissen .........................210/242 |

*Primary Examiner*—Reuben Friedman
*Assistant Examiner*—T. A. Granger
*Attorney*—Kimmel, Crowell & Weaver

[57] ABSTRACT

A log boom for sweeping an oil slicked body of water, the boom being formed of a buoyant material and being connected in towing relationship with a suitable vessel, the boom being provided with jet nozzles submerged below the oil slicked surface and connected with a fluid source, water for example, to induce a current flow on the oil slick to force the oil slick in a direction away from the leading side of the boom for collection in the vessel, the fluid under pressure preventing oil slick leakage under, through or over the boom due to the existence of currents, waves or winds.

7 Claims, 8 Drawing Figures

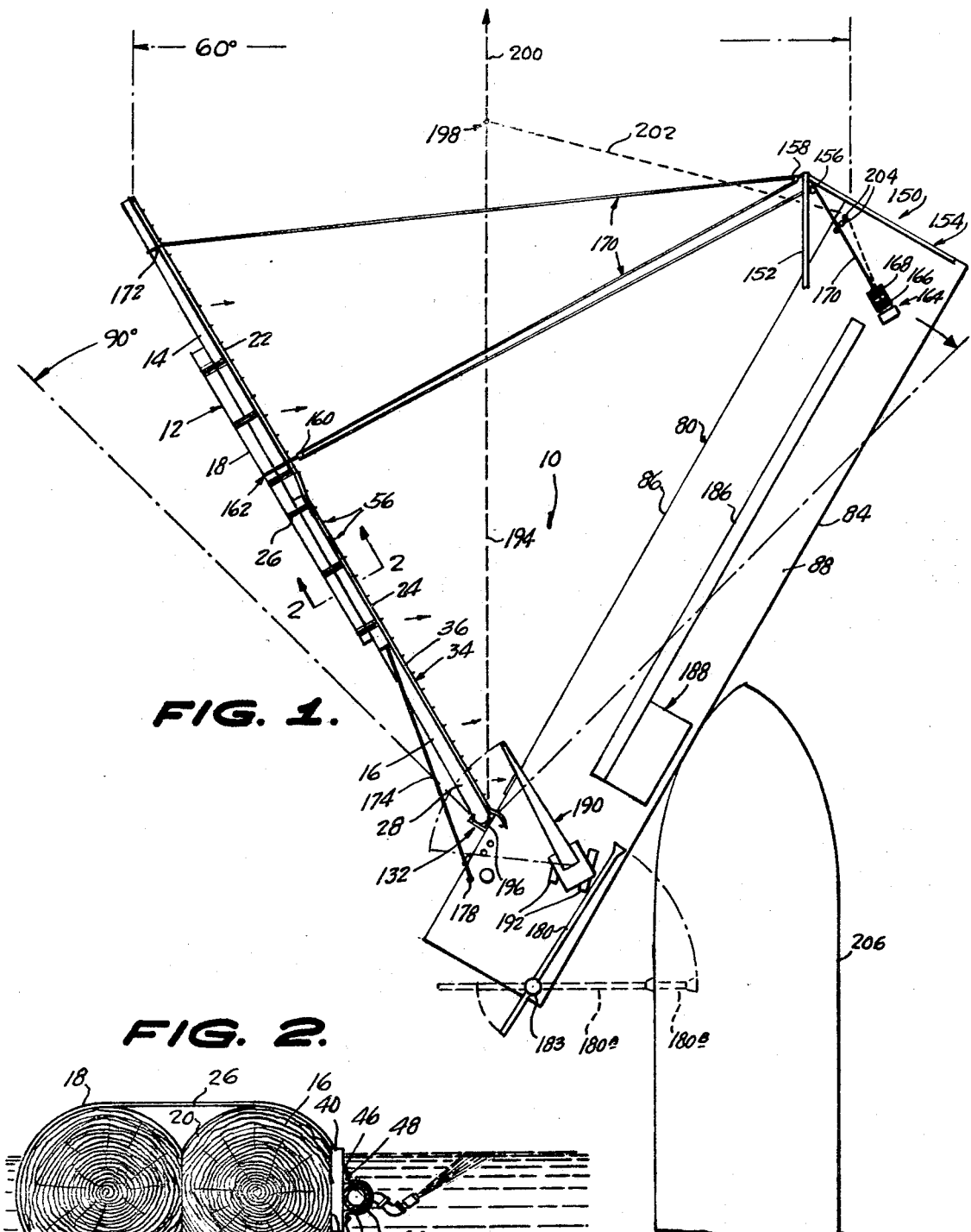

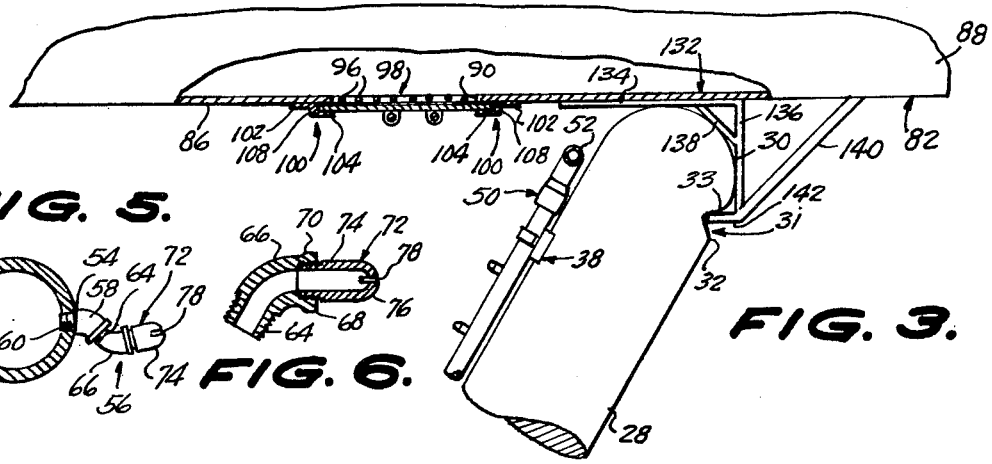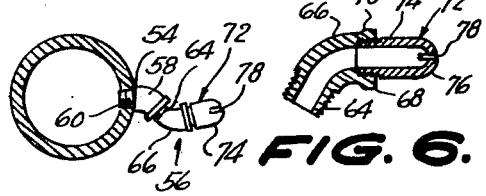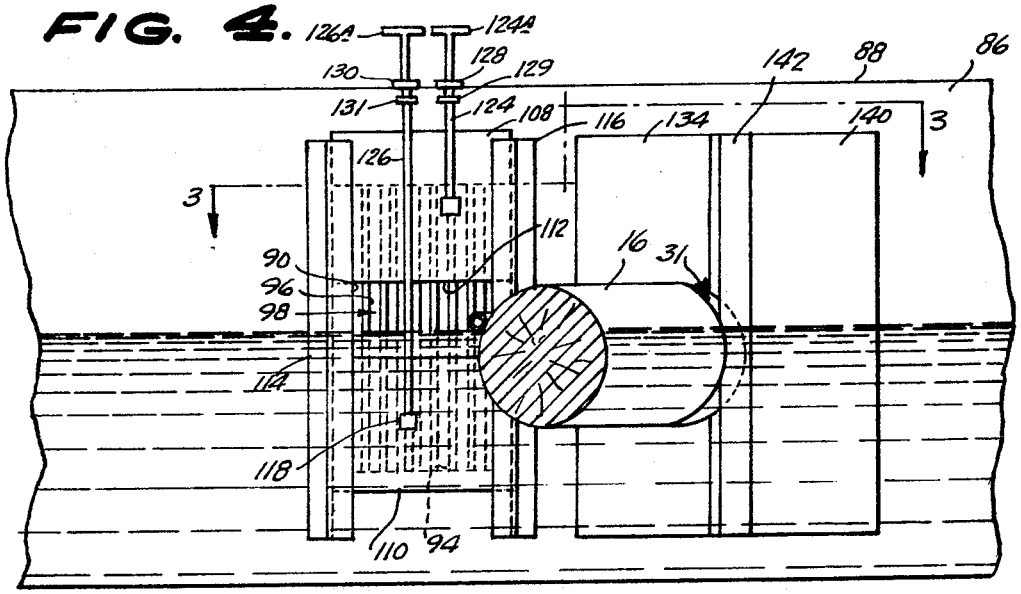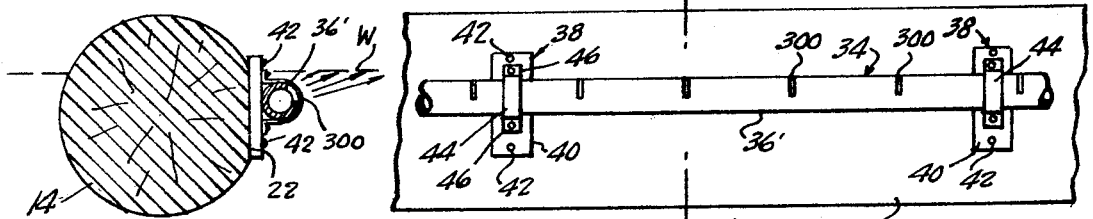
INVENTORS.
DAVID L. PETERSON,
CLIFFORD M. COLE,
By Kimmel, Crowell & Weaver
ATTORNEYS.

3,661,264

LOG BOOM SYSTEM FOR SWEEPING OIL SLICKS FROM A LARGE BODY OF WATER

CROSS-REFERENCE TO RELATED APPLICATION

This application is complemented by our copending application entitled "APPARATUS FOR SEPARATING AN OIL SLICK FROM A LARGE BODY OF WATER," application Ser. No. 877,169, filed Nov. 17, 1969.

BACKGROUND OF THE INVENTION

1. Field of the Invention

This invention relates to hydraulic engineering and, more specifically, to a log boom floatingly supported on a body of water and having an end swingably connected to a side of a vessel moving in a preselected direction. The log boom is provided with a plurality of water jet nozzles for directing a stream of high pressure water against an edge of the oil slick to drive the oil slick away from the boom and towards the adjacent side of the vessel into which the water and oil are admitted for subsequent separation, one from the other.

2. Description of the Prior Art

The known prior art is deemed to be merely of interest with respect to the boom construction of the instant invention. Representative of the general state of the art are the U.S. Pats. issued to Dahan, No. 3,369,664, Simpson, No. 2,682,151 and Muller, No. 3,221,884. Broadly speaking, these patents are pertinent in that they only show devices for surrounding an oil slick or another body of liquid. Of these patents, those to Muller and Dahan disclose means for sucking oil off the surface of the water as contrasted against applicants' invention which uses high pressure water streams for forcing an oil slick towards and into a vessel for subsequent separation.

SUMMARY OF THE INVENTION

The present invention is directed to the provision of means for sweeping oil slicks from large bodies of water. The problem has long existed and attention has been almost universally focused thereon occasioned by the wrecking of oil tankers carrying huge volumes of oil, the oil being released to spread upon the surface of the water where it was subsequently washed upon beaches having national prominence. While the wrecking of the oil tankers and the loss of the oil represented a high financial loss to those interested in the venture, still other economic losses were incurred for before the beaches could be used, the spilled oil remaining in the water had to be dispersed and the beaches cleaned and resanded. The money expended in the cleanup operations was not inconsiderable, and the loss of income to resort hotels and other facilities adjoining such a beach was not nominal.

The danger of oil pollution of bodies of water and destruction of beaches is not restricted to the transportation of oil over water. For example, offshore oil drilling operations are taking place in many locations contingent to the coastline of the United States. Some operations have been and are still being carried out in South American countries, for example, in Venezuela. Recently, the news media carried reports of an oil leak in an offshore oil drilling operation being conducted off the coast of California. Again, much beach property was threatened with destruction, and restaurants, hotels, and other business operations were threatened with major financial losses resulting from reduced tourist spending. This economic loss was averted only by the use of major manpower and emergency techniques.

Oil spillage, regardless of the cost thereof, also constitutes an ever present danger to marine and fowl life. Thousands of birds have been destroyed because of the oil accumulation on their feathers, and incalculable numbers of fish and other types of marine life have been destroyed as a consequence of oil leakage. This is a public loss which should be rectified.

With the advent of the new super tankers carrying huge quantitites of oil, it is foreseeable that should one of such ships be destroyed offshore and its oil spread over the water surface and washed upon our beaches, an enormous disaster would occur. The present invention is designed to meet such an accident and related incidents which would have adverse effect upon members of the public, marine and fowl life.

This invention relates specifically to the provision of a log boom floatingly supported on the surface of a body of water and having an end thereof swingably connected with a barge or other similar type vessel in such a manner that the boom will sweep oil slicks over a wide area of the water surface and push the oil slick by means of high pressure water jet streams away from the boom in the direction of the barge in which the oil slick is received and separated from the water. The boom and barge cooperate in such a manner as to sweep large areas of water surface to prevent oil deposited thereon from washing upon adjacent beaches and quickly and easily directs the oil slick towards the towing barge in which means is provided for separating the oil from the water. Thus, shore property is protected from serious damage, marine and fowl life are protected against destruction, and the recovery of the oil from the water at a subsequent stage following the sweeping operation, serves to reduce economic losses.

Aside and apart from the major objects set forth in the paragraph immediately above, the present invention contemplates the provision of a log boom system which is non-complex in construction and assembly, inexpensive to manufacture and maintain, and which is rugged and durable in use.

Other and further objects and advantages of the instant invention will become more manifest from a consideration of the following specification when read in the light of the annexed drawings.

BRIEF DESCRIPTION OF THE DRAWINGS

IN THE DRAWINGS

FIG. 1 is a top plan view of a log boom system constructed in accordance with this invention;

FIG. 2 is an enlarged detail cross-sectional view, FIG. 2 being taken substantially on the vertical plane of line 2—2 of FIG. 1, looking in the direction of the arrows, and illustrating components of the boom including the water jet nozzles;

FIG. 3 is an enlarged fragmentary detail cross-sectional view, FIG. 3 being taken substantially on the line 3—3 of FIG. 4, looking in the direction of the arrows, and showing details of the boom connection with the towing vessel and of the weir construction;

FIG. 4 is a side elevational view of one side of the towing vessel and again illustrating details of the connection of the boom with the vessel and the construction of the weir;

FIG. 5 is a detail cross-sectional view, partly in elevation, and illustrating the boom header construction and one of the water jet nozzles;

FIG. 6 is a longitudinal medial cross-sectional view of one of the water jet nozzles;

FIG. 7 is a fragmentary side elevational view of one of the logs of the log boom and showing a fragment of the header in which a second water jet nozzle has been formed; and FIG. 8 is a detail transverse cross-sectional view, FIG. 8 being taken substantially on the vertical line of 8—8 of FIG. 7, looking in the direction of the arrows.

BRIEF DESCRIPTION OF THE FIRST EMBODIMENT

Referring now more specifically to the drawings, reference numeral 10 designates a boom system constructed in accordance with the teachings of this invention. The boom per se, is generally designated by reference numeral 12 and comprises a pair of logs 14, 16 disposed in abutting end to end relationship relative to one another, and a third log 18 superimposed against the logs 14, 16 and spanning the abutting connection therebetween. As is seen in FIGS. 1 and 2, the adjacent confronting and engaged sides of the logs 14, 16 with the log 18 are planar and are contained in a normally upright common plane indicated by reference numeral 20. The logs 14, 16 are also formed with oppositely disposed normally upright planar surfaces 22, 24 which are substantially parallel to the plane of the coincident plane 20, and which cooperate to form the leading side of the boom. The logs 14, 16 and 18 are bound together by a plurality of longitudinally spaced straps, cables or other lashing indicated by reference numeral 26.

The log 16 may have its outer portion 28 cylindrical in transverse cross-section, and this portion terminates in a rounded end 30, see FIGS. 3 and 4. To serve a function to be described, that side of the log 16 oppositely disposed with respect to its planar side 24 is formed with a normally upright inwardly extending V-shaped notch 31 defined by side walls 32, 33 disposed at right angles relative to one another.

Reference numeral 34 generally designates an elongated substantially hollow cylindrical header which may be formed of any suitable material. The header 34 includes an elongated cylindrical side wall 36. Hanger bracket means for the header 34 bear the general reference numeral 38, these means each comprising a substantially rectangular base block 40 fixedly connected on the planar sides 22, 24 by conventional fasteners 42, and an arcuate clamp sleeve 44 normally having a semi-cylindrical configuration and receiving a portion of the side wall 36 snugly therein. The free ends of the sleeve 44 terminate in diverging flanges 46 which are fixedly connected to the block 38 as by conventional fasteners 48.

The header 34 extends longitudinally of the logs 14, 16 and the hanger brackets 38 are secured thereon at longitudinally spaced intervals, as desired. To serve a function to be described, the inner end of the header (that end adjacent the rounded end 30 of the log 16) is connected by a conventional coupler device 50 (see FIG. 3) to one end of an elongated hollow flexible conduit 52, the other end of the conduit 52 being connected to a suitable source of water under pressure.

The invention contemplates the selected use of several types of nozzle means in connection with the header 34 and this, in turn, dictates the relative position of the header and the clamp sleeve 44 with respect to the base block 40. One such nozzle means is specifically described below.

FIGS. 1, 2, 3, 5 and 6 all relate to a header having nozzle means thereon for moving the oil slick by a submerged nozzle system. In such a system, the header 34 is tapped and threaded as at 54 (see FIG. 5) at selected longitudinally spaced intervals to receive nozzle means, the latter here bearing the general reference numeral 56 (see FIGS. 5 and 6). The nozzle means 56 each comprises a first hollow cylindrical elbow pipe 58 having an externally threaded end 60. The other end 64 of the elbow pipe 58 is internally threaded to receive the externally threaded end 64 of a second hollow elbow pipe 66. The other end of the pipe 66 is internally threaded as at 68 to receive the externally threaded end 70 of a water jet nozzle 72. Each nozzle 72 (see FIGS. 5 and 6) also includes an axially elongated cylindrical side wall 74 having a rounded or semi-spherical end closure wall 76 through which a slot 78 transversely extends to effect communication with the interior of the side wall 74.

It is thus seen that by adjusting the elbow pipes 58, 66 relative to the header pipe 36 and with respect to one another, any desired water jet stream pattern may be obtained. In the use of the nozzles 72 the header is preferably clamped by the sleeves 44 in such a manner so as to submerge the header 36 adjacent to but below the upper surface of the body of water W (see FIG. 2), and the angularity of the nozzles 72 relative thereto is then individually adjusted to form a desired current pattern.

Reference numeral 80 generally denotes an elongated barge or separator vessel, the details of the construction of which are fully described in our above-referred-to copending application. Consequently, only such description thereof will be made at this time which will serve to render intelligence to the instant invention.

The barge or separator vessel 80 includes a hull 82 (see FIG. 3) having normally upright side walls 84, 86, and a top deck 88. A vertically elongated transversely extending opening 90 is formed in the side wall 86, and fixedly connected to its top and bottom edges 92, 94 are the opposed ends of a plurality of elongated laterally spaced rigid rods 96 which cooperate with the openings 90 to form a screen or trash rack 98 to intercept flotsam.

Each reference numeral 100 indicates a guide means comprising a substantially Z-shaped plate including a pair of flanges 102, 104 disposed in laterally spaced and parallel relation relative to one another and having their adjacent edges connected by a bight 106. Each of the flanges 102 are connected, respectively, to the side wall 86 adjacent to but spaced away from each vertically extending marginal edge of the opening 90. The flanges 104 confront, in laterally spaced relation, the immediately adjacent marginal edge portions of the side wall 86 that define the sides of the opening 90, and these flanges, the confronting portions of the side wall 86 taken together with the bights 106, form the guide means 100 to which reference above has been made.

Reference numerals 108, 110 denote identical substantially rectangular elongated upper and lower slide plates having their opposed ends slidably received in, respectively, one of the guide means 100. Means is provided for vertically adjusting the lower edge 112 and the upper edge 114 of the slide plates 108, 110, respectively, relative to one another and to the upper edge of the body of water W, it being here understood that the lower end of the opening 90 normally extends therebelow. To this end, identically constructed bosses 116, 118 are fixedly connected to the outer side of each of the plates 108, 110, respectively. Each of the bosses 116, 118 is connected to the lower ends 120, 122, respectively, of a pair of elongated shafts 124, 126, the upper ends of the shafts each being engaged by conventional pairs of friction clamps 128, 129 and 130, 131, respectively, the pairs of clamps being secured to the top deck 88 and to the side wall 86 and project laterally therefrom. The upper ends of the shafts 124, 126 are each connected, respectively, to conventional handle means 124A, 126A.

Socket means 132 is provided to journal the rounded end 30 of the log 16 (see FIGS. 5 and 6) for swinging movement on the vessel 80. The means 132 is secured aft or rearwardly of the opening 90 and comprises an L-shaped plate having a vertically elongated leg portion 134 fixedly connected to the side wall 86 by conventional means, and a laterally projecting foot portion 136. A vertically elongated brace member or plate 138 spans the inner corner of the means 132 and has its opposed ends fixedly connected to the leg and foot portions 134, 136, respectively. The means 132 further includes a second vertically elongated L-shaped plate having an elongated leg section 140 and a relatively short foot section 142. The outer end of the leg section 140 is rigidly connected to the side wall 86, and the other end thereof projects laterally away therefrom at an acute angle towards the foot portion 136, and the outer end of the foot portion 136 is rigidly connected to the inside corner formed at the junction of the leg and foot portions 140, 142, respectively. The foot portion 136 is perpendicular to its leg portion 134 and is perpendicular to the foot section 142. It will be noted that the latter extends parallel to the length of the inner end of the leg portion 134 in spaced confronting relationship relative thereto.

As is seen in FIG. 3, the rounded end 30 is engaged within the socket 132, this end making tangential engagement with the leg portion 134, the brace 138, and the foot portion 136. In the normal working position of the boom 12, the notch 31 loosely receives the outer end of the foot section 142 therein. The components of the socket 132 enable the boom end 30 to have universal movement with respect to the hull of the vessel 82, thus enabling the boom to swing laterally about the socket to selected angular positions relative thereto and also to swing heightwise about the socket in response to wave conditions. Also, the socket 132 components serve as vertical guide means for the boom 12 whereby its end 30 may automatically slide upwardly or downwardly therein to adjust itself in accordance to the depth the vessel 82 sinks into the body of water. This will vary in accordance with the amount of ballast (water) carried and discharged as the oil separation process is carried out, and in accordance with the amount of oil recovered and retained on board.

Certain basic rigging is provided to control the sweep of the boom and reference is again made to the top deck 88 of the vessel 80. Such rigging is schematically shown in FIG. 1 and has been reduced to bare essentials. More sophisticated equipment could be utilized.

Thus, mounted on the top deck 88 adjacent to but spaced inwardly from the bow end, and adjacent to but spaced frmm the port or left side of the vessel 80 is an outrigger tower 150 which includes a vertical mast 152 having its lower end fixedly connected on the deck 88 adjacent to but spaced from the bow end of the vessel 80 and adjacent its port or left side. Suitable stay or guide means 154 have one of their respective ends fixedly anchored to the port and starboard sides of the vessel 80 forward of the mast 152. The outer ends of the means 154 are fixedly connected to the upper end of the mast 152.

Reference numerals 156, 158 denote pulleys mounted on the upper end of the mast 152, and a third similar pulley 160 is connected by a strap or other conventional means 162 to the boom 12 intermediate its ends.

A power driven windlass 164 includes a pair of drums 166, 168. One end of a flexible boom control line 170 is anchored on the drum 168 while its other end is reeved through the pulleys 156, 160, and 158, in the order named, and is anchored by conventional means (not shown) carried on the lashing 172 supported on the outer end of the log 14. Thus, depending upon the direction of rotation of the drum 168, the cable 170 will be payed out or taken in, and this will cause the boom 12 to move, changing its angular relationship relative to the side wall 86.

As is seen in FIG. 1, one end of a boom retainer line 174 is connected by a conventional strap or lashing means 176 to the log 16, and its other end is secured to a stanchion or capstan 178, the latter being supported on the top deck 88.

Also mounted on the top deck 88 is an adjustable strut 180 which is carried in a housing 182. The strut 180 may be swung from its inoperable full line on deck position shown in FIG. 1 to its dotted line operative position 180A wherein its effective length has been shortened. Again, and under a different set of conditions, the strut 180 may be extended and secured in its dotted line position 180B. The housing 182 is located adjacent the stern end of the vessel 80 and at the right side thereof, and the outer end of the strut 180 may be enlarged as at 184 and may include a fender to avoid damaging the side wall of the vessel when engaged thereagainst.

Other structure carried on the top deck may include an elongated pipe corridor 186, a boiler, generator, radio and warm room 188, and a utility crane 190 mounted for travel over rails 192 fixedly secured to the top deck 88. Suitable rigging carried on the crane may be connected to the handles 124A, 126A to effect the raising or lowering of the two plates 108, 110 upon release of the clamping means. Since these are features of the vessel 80 forming no part of the present invention, these components are but briefly mentioned for the purpose of completeness.

In the utilization of the boom, it will be assumed that the conduit 52 has been connected to a source of water under pressure, and that the nozzles 72 have been adjusted so that their jet water streams are directed upwardly to impinge against an edge of an oil slick. Let it further be assumed that a fixed length of a towing bridle 194 has one of its ends fixedly connected on a stanchion 196 mounted on the top deck 88, and the other end of the bridle 194 terminates in a conventional towing coupler 198 which, in turn, is connected to one end of a towline 200. The other end of the towline 200 is connected to a tugboat or other similar towing vessel (not shown). One end of an adjustable leg of tow bridle 202 is connected to the coupler 198 and is snaked around a selected one of the stanchions 204, the other end of the bridle 202 being anchored on the drum 166. It will thus be understood that with the operation of the drum 168 of the windlass 164, the angular relationship between the vessel side 86 and the towline 200, which is, in fact, the tow direction, may be changed in accordance with existing conditions.

A tender 206 is shown in FIG. 1 as having its port bow engaging the starboard side wall 84 abaft the midship portion of the vessel 80. In this position, the strut 180 is moved to its engaged dotted line operative position 180A and is secured therein by means not shown. The tender 206 is thus disposed in push-tow position.

It should be here understood that the vessel 80 could be self powered and provided with conventional steering mechanisms thereby eliminating the necessity for employing a tugboat and/or the tender 206. In a similar manner, the boom system could be towed by means of the towline 200 without the use of the tender 206 and vice-versa. Any suitable power source could be employed for moving the boom system over the body of water W, and the power source specifically described above and illustrated in the drawings is to be considered as being offered merely by way of example, and is not to be treated as by way of limitation.

With respect to certain specifics, it is believed that to effectively sweep in a body of water as, for example, the open ocean, a vessel having a length of 190 feet from bow to stern and a beam width of 32 feet has been found to work satisfactorily with a boom length of 150 feet. An effective sweep under moderate wave conditions may be made with the boom positioned at 60° relative to the side 86 as shown in FIG. 1, and in dead calm, the rigging may be operated to permit the boom 12 to be positioned at right angles relative to the adjacent side of the vessel 80. The latter position is but schematically illustrated in FIG. 1. In the full line 60° position, the sweep is 158 feet, and at 90° the sweep is 226 feet.

With the vessel 80 under way, the towline 200 being connected to a suitable tug or other ship, and/or with the tender 206 in its position shown in FIG. 1, and with the submerged nozzles preadjusted in the manner described above to direct their respective water streams upwardly and forwardly to impinge against the edge of an oil slick, the oil is driven forwardly in the direction of travel and towards the vessel 80 which acts as a second boom in a V-shaped boom system. The oil slick and the system move relative to one another in such a manner as to cause the slick to move in the direction of the apex of the V-system.

The slide plates 108, 110 will have been adjusted to an open position as is illustrated in FIG. 4, so that the oil slick (and some water) is forced by the jet streams from the nozzles to enter the opening 90 where it is received in a specially designed compartment (not shown) located in the vessel 80, all for the purpose of later separation.

This completes the description of the first preferred embodiment of this invention.

DESCRIPTION OF THE SECOND PREFERRED EMBODIMENT

The second preferred embodiment of this invention involves only a change in the construction of the header 36 of the first embodiment described above, its position relative to the surface of the body of water W, and a change in its position on the base block 40.

More specifically, and referring to FIGS. 7 and 8, the header here designated by reference numeral 36' is seen to be formed with a plurality of axially spaced, elongated and arcuately shaped slots 300. The header 36' is clamped on the base block 40 in the manner described above with the slots 300 facing outwardly and upwardly away from the planar side 24, but note that in this instance, the clamp sleeves 44 are substantially centrally located relative to their associated base blocks 40. This disposes the header 36' below the surface of the water W so that the upwardly directed stream (see arrows in FIG. 8) will impinge against the edge of the oil slick to drive it in the direction of the vessel 80 for collection therein after passing through the opening 90.

While the two embodiments of this invention described and illustrated herein all utilize a jet stream, it will be understood that a similar operation could be undertaken without the use of the jets. This could be accomplished if the wind, current and/or waves are not too great. The basic operating principle is to induce a water flow on the surface of the body of water W in a direction away from the boom which will carry the floating oil away from the boom for short distances, and prevents leakage of the oil slick under, through, or over the boom under reasonable conditions of currents, winds and/or waves.

It will be understood from the foregoing description and from an examination of the annexed drawings that the opening 90 and the closure slide plates 108, 110 as well as the boom connecting means could be located on the opposite side of the vessel 80 and/or the vessel 80 may be constructed with such means on both sides thereof.

It will be further understood that with the use of the log boom according to the first or second preferred embodiments, the vessel 80 and, more specifically, the side wall 86 thereof, forms a second arm of the boom system for it cooperates with the boom to form this particular system which is highly effective in sweeping any given area.

From the foregoing description, and from a consideration of the drawings, it should now be clear that the boom 12 is free to move vertically along the vessel side in addition to being capable of swinging freely, thus allowing the boom 12 to remain at the water surface regardless of wave action or of the vessel ballast. Also, it will be further understood that the coupler 50 would be of the releasable type to permit disconnection from the header in order to store the boom 12 when it is not in use.

Having described and illustrated the inventive concepts according to this invention in detail, the same are defined in the appended claims.

What is claimed is:

1. A system for sweeping an oil slick from the surface of a body of water comprising:
   a hull having an opening formed in a wall thereof to receive said slick therethrough;
   a buoyant boom, extending from said wall, formed of an elongated member floatable on said surface having a pair of opposed ends; and
   socket means, so constructed as to connect one end of said member to said hull for universal movement about said end and as to enable said end to move upwardly and downwardly with respect to said hull, comprising:
   a first L-shaped plate having its leg portion fixedly connected on said wall rearwardly of said opening with its foot portion projecting laterally therefrom;
   a brace member spanning the inner corner formed at the junction of said leg and foot portions and rigidly connected thereto;
   a second L-shaped plate having leg and foot sections, the outer end of said leg section being fixedly connected to said wall rearwardly of said first L-shaped plate with its other end projecting forwardly at an acute angle relative to said wall and having its foot section extending parallel to an inner portion of said leg of said first L-shaped plate;
   the outer end of said foot portion of said first L-shaped plate being received and secured in the inner corner formed at the junction of said leg and foot sections of said second L-shaped plate;
   said floatable member end being rounded and received within said socket means and making tangential engagement with said leg and foot portions of said first L-shaped plate and with said brace member;
   said floatable member adjacent its rounded end having a notch formed therein to loosely receive the foot section of said second plate therein; and
   said leg and foot portions and sections and said brace member being normally disposed in upright planes.

2. The system as defined in claim 1 further comprising:
   means connecting the other end of said floatable member on said hull to connect said floatable member and said hull in preselected adjustable angular relationship relative to one another.

3. A system for sweeping an oil slick from the surface of a body of water comprising:
   a hull having an opening formed in a wall thereof that is intersected by said surface to receive said slick therethrough;
   a buoyant boom connected to and extending from said hull formed of an elongated member floatable on the surface of said body of water, said hull and said boom defining an area therebetween within which said hull opening is located; and
   current generating means comprising fluid jet nozzle means mounted on said boom below the surface of said body of water and constructed and arranged whereby said nozzle means is directed upwardly towards the surface of said body of water and within said area.

4. A system as defined in claim 3 wherein:
   said current generating means comprises an elongated substantially hollow header;
   a plurality of fluid jet nozzles mounted on said header in open communication therewith; and
   means for connecting said header with a fluid source under pressure.

5. A system as defined in claim 4 and:
   means on said header cooperating with means on said nozzle to adjust said nozzles relative to one another to create differing generated current patterns.

6. A system as defined in claim 4 wherein:
   said header is provided with a plurality of longitudinally spaced tapped openings;
   an elbow connector means for each of said openings and being adjustable therein;
   one of said fluid jet nozzles being adjustably connected, respectively, on one of said elbow connector means; and
   means securing said header on said boom with said nozzles submerged below said surface and opening forwardly and upwardly in the direction thereof.

7. A system as defined in claim 3 wherein said current generating means comprises:
   an elongated hollow header fixedly connected on said floatable member and having a plurality of longitudinally spaced slots opening therein, said header and said slots being submerged below said surface and opening upwardly and forwardly of said floatable member; and
   means for connecting said header with a fluid source under pressure.

* * * * *